(12) United States Patent
Chiba et al.

(10) Patent No.: US 6,473,536 B1
(45) Date of Patent: Oct. 29, 2002

(54) IMAGE SYNTHESIS METHOD, IMAGE SYNTHESIZER, AND RECORDING MEDIUM ON WHICH IMAGE SYNTHESIS PROGRAM IS RECORDED

(75) Inventors: Naoki Chiba, Higashiosaka (JP); Hiroshi Kano, Kyotanabe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/394,889

(22) Filed: Sep. 13, 1999

(30) Foreign Application Priority Data

Sep. 18, 1998 (JP) .......................................... 10-264223

(51) Int. Cl.[7] ................................................ G06K 9/36
(52) U.S. Cl. ...................................... 382/284; 345/630
(58) Field of Search ................................ 382/284, 285, 382/154; 348/46, 47; 358/540; 345/419, 427, 588, 630, 629

(56) References Cited

U.S. PATENT DOCUMENTS 5,907,626 A * 5/1999 Toklu et al. ................ 382/107
5,982,909 A * 11/1999 Erdem et al. ............... 382/103
6,304,669 B1 * 10/2001 Kaneko et al. ............. 382/154
6,392,647 B1 * 5/2002 Migdal et al. .............. 345/423
6,404,913 B1 * 6/2002 Ohki .......................... 382/154

* cited by examiner

Primary Examiner—Yon J. Couso
(74) Attorney, Agent, or Firm—Arent Fox Kintner Plotkin & Kahn, PLLC

(57) ABSTRACT

The present invention comprises the first step of dividing a first image and a second image for each triangular patch having three adjacent feature points as vertexes, and calculating a planer projective transform matrix for the triangular patch, and the second step of finding a coordinate value, on the first image, corresponding to each of pixels in each of the triangular patches, on the second image using the planer projective transform matrix calculated for the triangular patch, and finding a coordinate value, on the first image, corresponding to each of the pixels which does not belong to any of the triangular patches on the second image using a planer projective transform matrix calculated for the triangular patch closest to the pixel.

19 Claims, 10 Drawing Sheets

IMAGE SYNTHESIS METHOD, IMAGE SYNTHESIZER, AND RECORDING MEDIUM ON WHICH IMAGE SYNTHESIS PROGRAM IS RECORDED

BACKGROUND OF THE INVENTION

1. Field of the Invention

The present invention relates to an image synthesis method, an image synthesizer, and a recording medium on which an image synthesis program has been recorded.

2. Description of the Prior Art

A technique for calculating an optical flow from two images, and registering the two images on the basis of the obtained optical flow has been known. Description is made of a conventional method of calculating an optical flow.

(1) Lucas-Kanade Method

A large number of methods of calculating the apparent optical flow of a moving object in a moving image have been conventionally proposed. The Lucas-Kanade method which is a local gradient method out of the methods is one of the best methods. The reason for this is that the speed of processing is high, implementing is easy, and the result has confidence.

As for the details of the Lucas-Kanade method, see an article: B. Lucas and T. Kanade, "An Iterative Image Registration Technique with an Application to Stereo Vision," In Seventh International Joint Conference on Artificial Intelligence (IJCAI-81), pp.674–979, 1981.

The outline of the Lucas-Kanade method will be described.

When a gray scale pattern I=(x, y, t) of image coordinates p=(x, y) at time t is moved to coordinates (x+δx, y+δy) with its gradation distribution kept constant after a very short time period (δt), the following optical flow constraint equation (1) holds:

$$\frac{\partial I}{\partial x}\frac{\delta x}{\delta t} + \frac{\partial I}{\partial y}\frac{\delta y}{\delta t} + \frac{\partial I}{\partial t} = 0 \quad (1)$$

In order to calculate an optical flow {v=(δx/δt, δy/δt)=(u, v)} in a two-dimensional image, another constraint equation is required because the number of unknown parameters is two. Lucas and Kanade have assumed that the optical flow is constant in a local region of an object.

Suppose the optical flow is constant within a local region ω on an image, for example. In this case, a squared error E of a gray scale pattern which is to be minimized can be defined by the following equation (2) when the following substitutions are made:

$$I_0(P) = I(x, y, t),$$
$$I_1(p+v) = I(x+u, y+v, t+\delta t)$$
$$E = \sum_\omega [I_1(p+v) - I_0(p)]^2 \quad (2)$$

When v is very small, the terms of second and higher degrees in Taylor's expansion can be ignored, so that a relationship expressed by the following equation (3) holds:

$$I_1(p+v) = I_1(p) + g(p)v \quad (3)$$

where g(p) is a linear differential of $I_1(p)$.

The error E is minimized when the derivative of E with respect to v is zero, so that a relationship expressed by the following equation (4) holds:

$$0 = \frac{\partial}{\partial v}E \quad (4)$$
$$\approx \frac{\partial}{\partial v}\sum_\omega [I_1(p) + g(p)v - I_0(p)]^2$$
$$= \sum_\omega 2g(p)[I_1(p) + g(p)v - I_0(p)]$$

Therefore, the optical flow v is found by the following equation (5):

$$v \approx \frac{\sum_\omega g(p)[I_0(p) - I_1(p)]}{\sum_\omega g(p)^2} \quad (5)$$

Furthermore, the optical flow can be found with high precision by Newton-Raphson iteration, as expressed by the following equation (6):

$$v_{k+1} = v_k + \frac{\sum g_k[I_0 - I_1^k]}{\sum (g_k)^2} \quad (6)$$
$$I_1^k = I_1(p + v_k),$$
$$g_k = g(p + v_k),$$
$$I_0 = I_0(p)$$

(2) Hierarchical Estimation Method

The largest problem of the gradient methods, including the Lucas-Kanade method, is that they cannot be applied to a large motion because a good initial value is required. Therefore, a method of producing images respectively having resolutions which differ at several levels like a pyramid hierarchical structure to solve the problem has been conventionally proposed.

Images having resolutions which differ at several levels are first previously produced from each of two consecutive images. An approximate optical flow is then calculated between the images having the lowest resolution. A more precise optical flow is calculated between the images having resolutions which are higher by one level. The processing is successively repeated until the optical flow is calculated between the images having the highest resolution.

FIG. 4, FIG. 3, FIG. 2, and FIG. 1 respectively illustrate an original image, an image having a lower resolution than that of the original image shown in FIG. 4, an image having a lower resolution than that of the image having a low resolution shown in FIG. 3, and an image having a lower resolution than that of the image having a low resolution shown in FIG. 2. In FIGS. 1 to 4, S indicates one patch.

An optical flow is gradually found from the image shown in FIG. 1 (an image in a hierarchy 1) the image shown in FIG. 2 (an a hierarchy 2 the image shown in FIG. 3 (an image in a hierarchy 3), and the image shown in FIG. 4 (an image in a hierarchy 4) in this order. In FIGS. 1 to 4, an arrow indicates an optical flow vector found for each patch.

However, the problem is that in a real image, there are few regions containing sufficient texture, so that a reliable optical flow is not obtained.

A technique for affixing a plurality of images to one another and synthesizing the images to obtain a seamless image having a wide field of view and having a high resolution (image mosaicking) has been conventionally actively studied. Classical applications include synthesis of aerial photographs or satellite photographs. In recent years, a method of synthesizing a plurality of digital images to obtain a seamless panoramic image, and constructing a virtual reality environment has been paid attention to.

The following two methods have been known as a technique for obtaining a panoramic image by synthesis.

The first method is a method of first translating a camera to previously pick up a plurality of images. The plurality of images obtained are simultaneously displayed on a monitor by a personal computer. A user designates corresponding points between the two images, to synthesize the two images.

In the first method, the motion of the camera is restricted to translation. In the first method, the user must designate the corresponding points.

The second method is a method of fixing a camera to a tripod and restricting the motion of the camera to only rotation on a horizontal surface, to pick up a plurality of images. The plurality of images obtained are projected on a cylindrical surface, to synthesize the images (see U.S. Pat. No. 5,396,583).

In the second method, the, motion of the camera must be restricted to only rotation on a horizontal surface. Further, the focal length or the angle of view of the camera must be measured.

SUMMARY OF THE INVENTION

An object of the present invention is to provide an image synthesis method in which highly precise positioning is performed even when a scene having a large depth is obtained by synthesis, an image synthesizer,and a recording medium on which an image synthesis program has been recorded.

Another object of the present invention is to provide an image synthesis method in which a seamless panoramic image can be obtained from a plurality of images, a camera for picking up the plurality of images is allowed to freely move, and the focal length need not be measured, an image synthesizer, and a recording medium on which an image synthesis program has been recorded.

A first image synthesis method according to the present invention is an image synthesis method for synthesizing a first image and a second image without a seam on the basis of coordinate values, on the first image, respectively corresponding to a plurality of feature points which are set in a portion, which is overlapped with the second image, of the first image and coordinate values, on the second image, at positions, on the second image, respectively corresponding to the feature points, characterized by comprising the first step of dividing both the images for each triangular patch having the three adjacent feature points as vertexes, and finding a transform equation for finding a position, on the first image, corresponding to a point on the second image for the triangular patch; the second step of finding the coordinate value, on the first image, corresponding to each of pixels in each of the triangular patches, on the second image using the transform equation calculated for the triangular patch; the third step of synthesizing the first image and the second image using t he coordinate value, on the first image, corresponding to each of the pixels on the second image, which is found at the second step.

An example of the transform equation found for each triangular patch is a planar projective transform matrix. The planar projective transform matrix is found on the basis of corresponding points at the three vertexes of the triangular patch and a fundamental matrix representing epipolar constraint conditions between the first image and the second image, for example. The planar projective transform matrix may be found on the basis of a correspondence between corresponding points at the three vertexes of the triangular patch and epipoles representing epipolar constraint conditions between the first image and the second image.

An example of the transform equation found for each triangular patch is an affine transform matrix. The affine transform matrix is found on the basis of the corresponding points at the three vertexes of the triangular patch.

An image synthesizer according to the present invention is an image synthesizer for synthesizing a first image and a second image without a seam on the basis of coordinate values, on the first image, respectively corresponding to a plurality of feature points which are set in a portion, which is overlapped with the second image, of the first image and coordinate values, on the second image, at positions, on the second image, respectively corresponding to the feature points, characterized by comprising first means for dividing both the images for each triangular patch having three adjacent feature points as vertexes, and finding a transform equation for finding a position, on the first image, corresponding to a point on the second image for the triangular patch; second means for finding the coordinate value, on the first image, corresponding to each of pixels in each of the triangular patches, on the second image using the transform equation calculated for the triangular patch; third means for synthesizing the first image and the second image using the coordinate value, on the first image, corresponding to each of the pixels on the second image which is found by the second means.

A computer readable recording medium on which an image synthesis program has been recorded according to the present invention is a computer readable recording medium on which an image synthesis program for synthesizing a first image and a second image without a seam on the basis of coordinate values, on the first image, respectively corresponding to a plurality of feature points which are set in a portion, which is overlapped with the second image, of the first image and coordinate values, on the second image, at positions, on the second image, respectively corresponding to the feature points has been recorded, characterized by comprising the first step of dividing both the images for each triangular patch having three adjacent feature points as vertexes, and finding a transform equation for finding a position, on the first image, corresponding to a point on the second image for the triangular patch; the second step of finding the coordinate value, on the first image, corresponding to each of pixels in each of the triangular patches, on the second image using the transform equation calculated for the triangular patch; and the third step of synthesizing the first image and the second image using the coordinate value, on the first image, corresponding to each of the pixels on the second image found at the second step.

A second image synthesis method according to the present invention is an image synthesis method for synthesizing a first image and a second image, characterized by comprising the first step of extracting from the first image a plurality of partial images which are effective for tracking by an optical flow between the first image and the second image as feature points; the second step of tracking a point, on the second image, corresponding to each of the feature points on the first image on the basis of the optical flow between both the images; the third step of finding a coordinate value, on the first image, corresponding to each of pixels on the second image on the basis of each of the feature points on the first image and the corresponding points on the second image which is found at the second step; and the fourth step of synthesizing the first image and the second image on the basis of the coordinate value, on the first image, corresponding to each of the pixels on the second image which is obtained at the third step, the third step comprising the step of dividing both the images for each triangular patch having three adjacent feature points as vertexes, and finding a transform equation for finding a position, on the first image, corresponding to the point on the second image for the triangular patch, and the step of finding the coordinate value, on the first image, corresponding to each of the pixels in the triangular patch on the second image using the transform equation calculated for the triangular patch.

An example of the first step is one comprising the steps of extracting an overlapped portion between the first image and the second image, and extracting from the portion, which is overlapped with the second image, of the first image a plurality of partial images which are effective for tracking by the optical flow between both the images as feature points.

At the step of extracting the overlapped portion between the first image and the second image, the overlapped portion between the first image and the second image is extracted on the basis of either one of the SSD method and the normalized cross-correlation method.

An example of the second step is one comprising the step of finding the optical flow from the first image and the second image on the basis of an optical flow estimation method using the hierarchically structured Lucas-Kanade method for interpolating the optical flow having low confidence out of the optical flows obtained in the respective stages of the optical flow estimation method using the optical flows in its surrounding regions, and the step of tracking the point, on the second image, corresponding to each of the feature points on the first image on the basis of the obtained optical flow.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Description is now made of an embodiment in a case where the present invention is applied to a panoramic image synthesizer.

An optical flow estimation method employed in the panoramic image synthesizer will be described before describing the panoramic image synthesizer.

[1] Description of Optical Flow Estimation Method

An optical flow estimation method employed in the present invention presupposes hierarchical prediction for producing images having resolutions which differ at several levels like a pyramid hierarchical structure to gradually calculate an optical flow. A method of calculating an optical flow conforms to a gradient method such as the Lucas-Kanade method. That is, it presupposes an optical flow estimation method using a hierarchically structured gradient method. The Lucas-Kanade method is used as the gradient method.

The optical flow estimation method employed in the present embodiment is characterized in that an optical flow obtained in each of stages of the optical flow estimation method using the hierarchically structured Lucas-Kanade method is filled by dilation processing. This will be described in detail below.

One of advantages of the Lucas-Kanade method is that the result of trading has confidence. Tomasi and Kanade have showed that the trackability of a region can be calculated from image derivatives as follows (C. Tomasi and Kanade, "Shape and Motion from Image Streams: a Factorization Method-Part 3 Detection and Tracking of Point Features," CMU-CS-91-132, Carnegie Mellon University, 1991).

From a 2×2 matrix of coefficients G in the following equation (7) having as elements the squares of differentials in the vertical and horizontal directions of an image ω in a region, its eigenvalues are calculated, thereby making it possible to determine the trackability of the region:

$$G = \sum_{p \in \omega} g(p)g(p)^T \tag{7}$$

When both the eigenvalues of the matrix G are large, the region changes in orthogonal directions, and can be uniquely positioned. Consequently, the confidence γ of the result of tracking can be obtained by the following equation (8) from the smaller eigenvalue $\lambda_{min}$ and a gray scale residual E between the regions after the tracking:

$$\gamma = \frac{\lambda_{min}}{E} \quad (8)$$

The inventors and others of the present invention have developed a method of interpolating a region having low confidence using the result having high confidence in the same hierarchy in an optical flow. This uses the result in a hierarchy at the next coarser resolution level for only an initial value for tracking and does not utilize the result in a hierarchy at the current resolution level which is paid attention to. It is assumed that an optical flow in a region which is hardly textured has a value close to optical flows in its surrounding regions, to fill a flow field by morphology processing.

Figure 1:
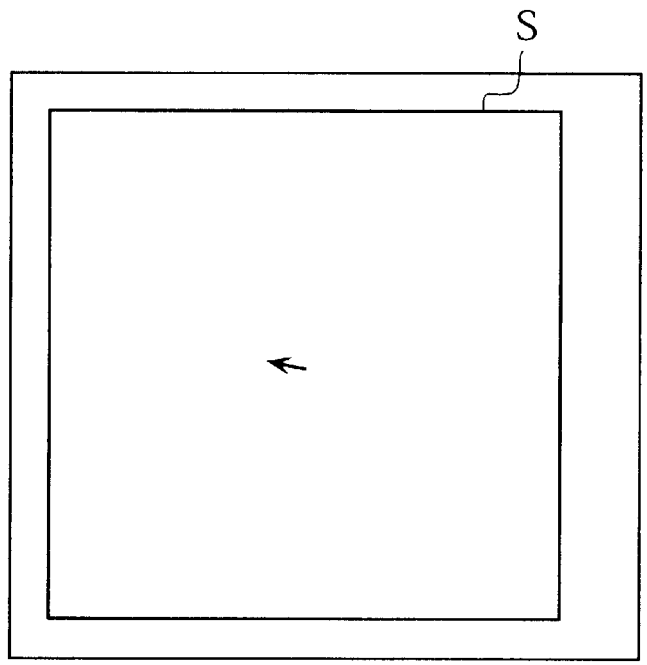
FIG. 1 is a schematic view for explaining a hierarchical estimation method, which illustrates an image in a hierarchy 1.
Figure 2:
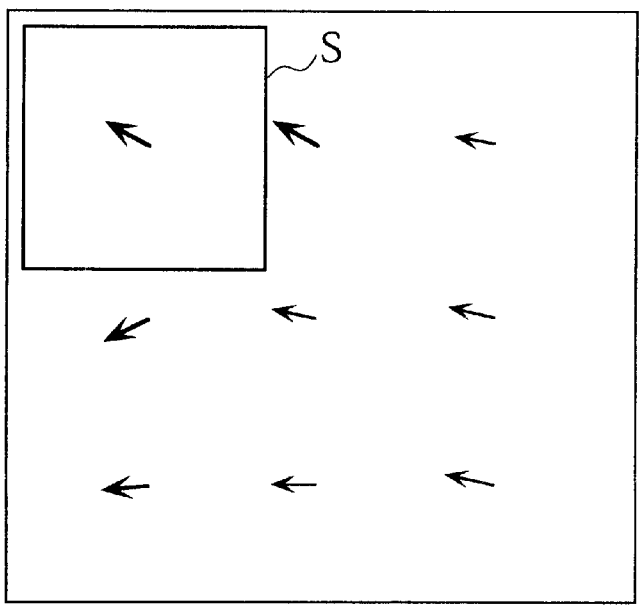
FIG. 2 is a schematic view for explaining a hierarchical estimation method, which illustrates an image in a hierarchy 2.
Figure 3:
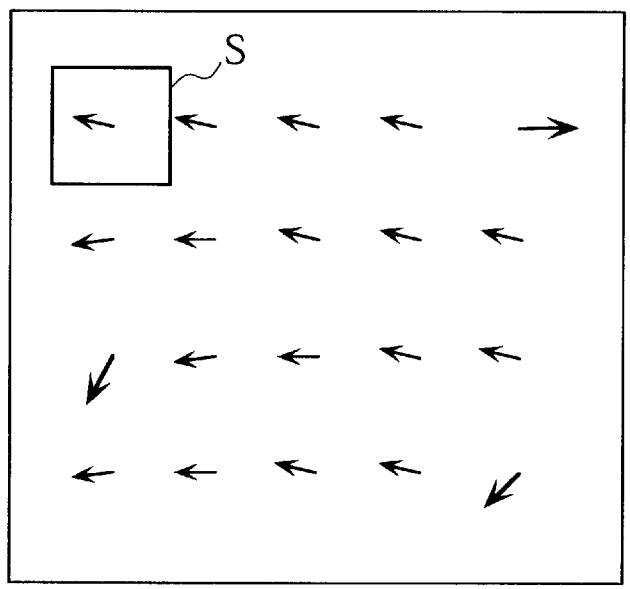
FIG. 3 is a schematic view for explaining a hierarchical estimation method, which illustrates an image in a hierarchy 3.
Figure 4:
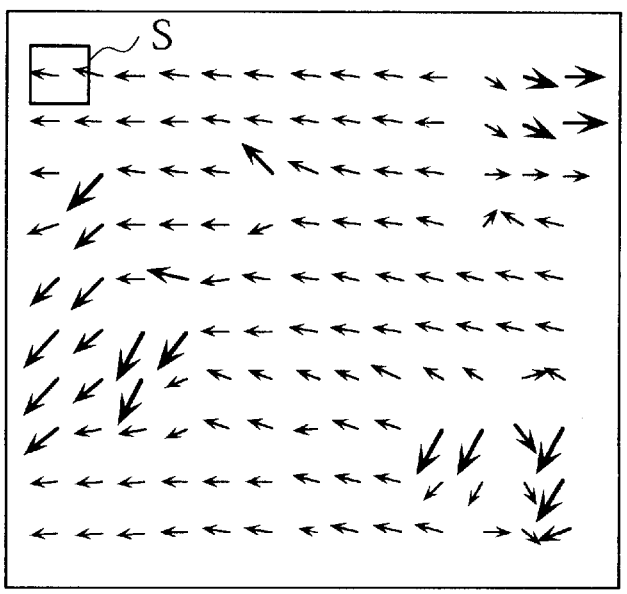
FIG. 4 is a schematic view for explaining a hierarchical estimation method, which illustrates an image in a hierarchy 4.
Figure 5:
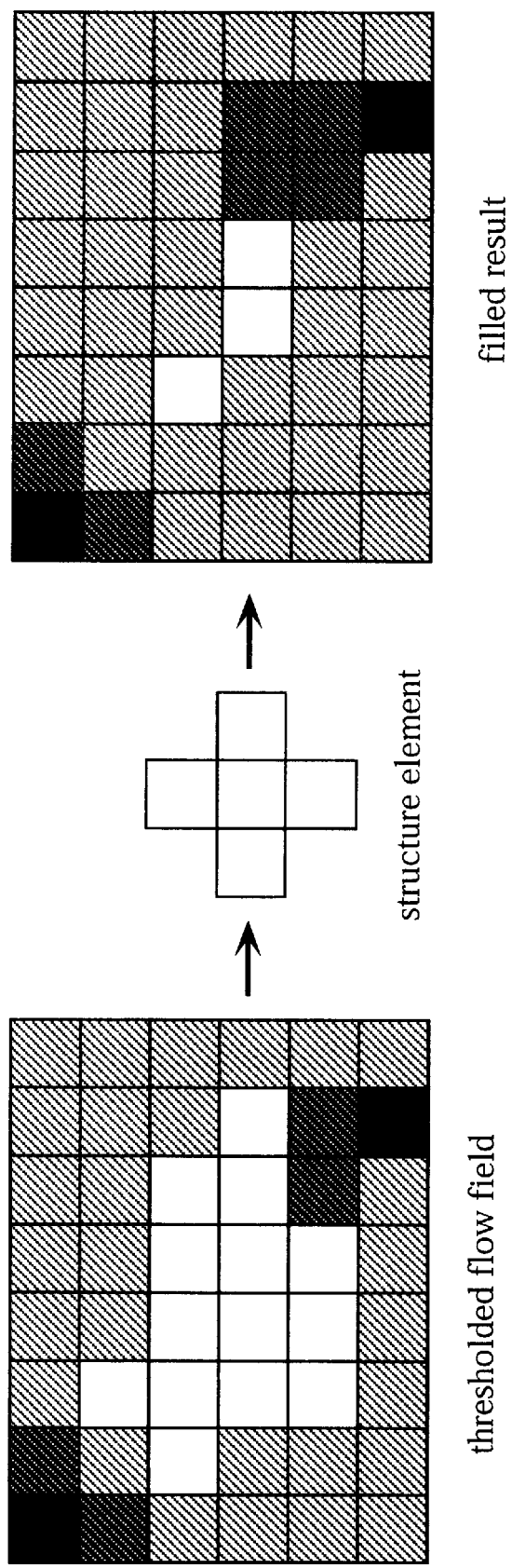
FIG. 5 is a schematic view for explaining dilation processing performed in an optical flow estimation method employed in the present embodiment.

FIG. 5 shows how flow vector dilation processing is performed.

The left drawing represents a map of the confidence of a flow vector on a gray scale. It is assumed that the blacker the map is, the higher the confidence is.

Obtained flow is first subjected to threshold processing. A white portion is subjected to threshold processing because the result has low confidence.

The dilation processing of the result in the flow field is then performed as follows in imitation of hole filling processing using a morphology operation in a binary image. A flow vector u(i, j) in coordinates i,j of a region can be calculated, as expressed by the following equation (9), upon being weighted depending on confidence γ from flow vectors in its four vicinities:

$$u(i, j) = \sum_{p,q} \frac{\gamma(i+p, j+q) \times u(i+p, j+q)}{\gamma_A} \quad (9)$$

$(p, q) = (0, 1), (0, -1), (-1, 0), (1, 0)$ $$\gamma_A = \sum_{p,q} \gamma(i+p, j+q)$$

The processing is repeated until all regions having low confidence which have been subjected to threshold processing are filled. The filling processing is performed in each hierarchy. The flow vector u(i, j) in the coordinates i,j of the region may be calculated upon being weighted depending on confidence γ from flow vectors in its eight vicinities.

Figure 6B:
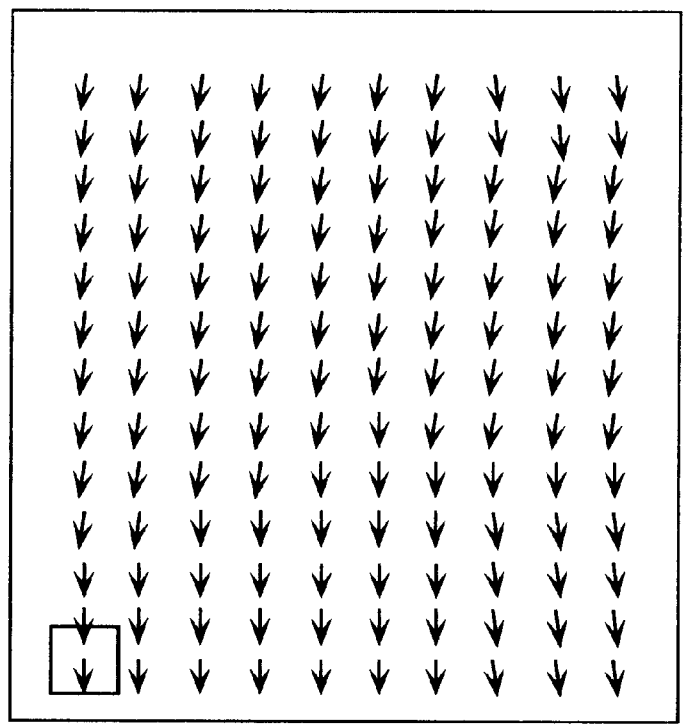
FIG. 6b is a schematic view showing optical flow after filling.
Figure 6A:
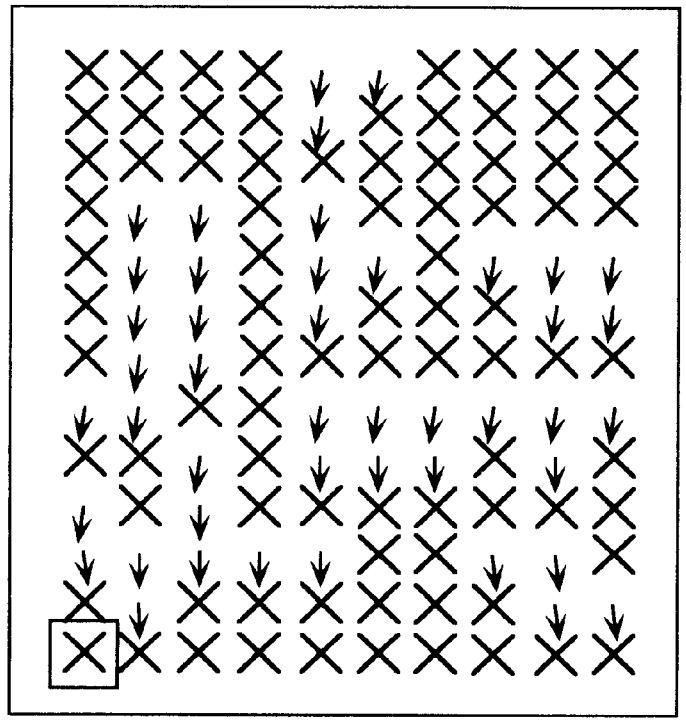
FIG. 6a is a schematic view showing an example of an optical flow which has been subjected to threshold processing for an image in a hierarchy.

FIG. 6a shows optical flow which has been subjected to threshold processing for an image in a hierarchy, and FIG. 6b shows optical flow after filling. In FIG. 6a, arrows are optical flow vectors whose confidence is judged to be high by the threshold processing, and × marks indicate portions whose confidence is judged to be low.

[2] Description of Panoramic Image Synthesizer

Description is now made of a panoramic image synthesizer for obtaining a seamless panoramic image from a plurality of images.

Figure 7:
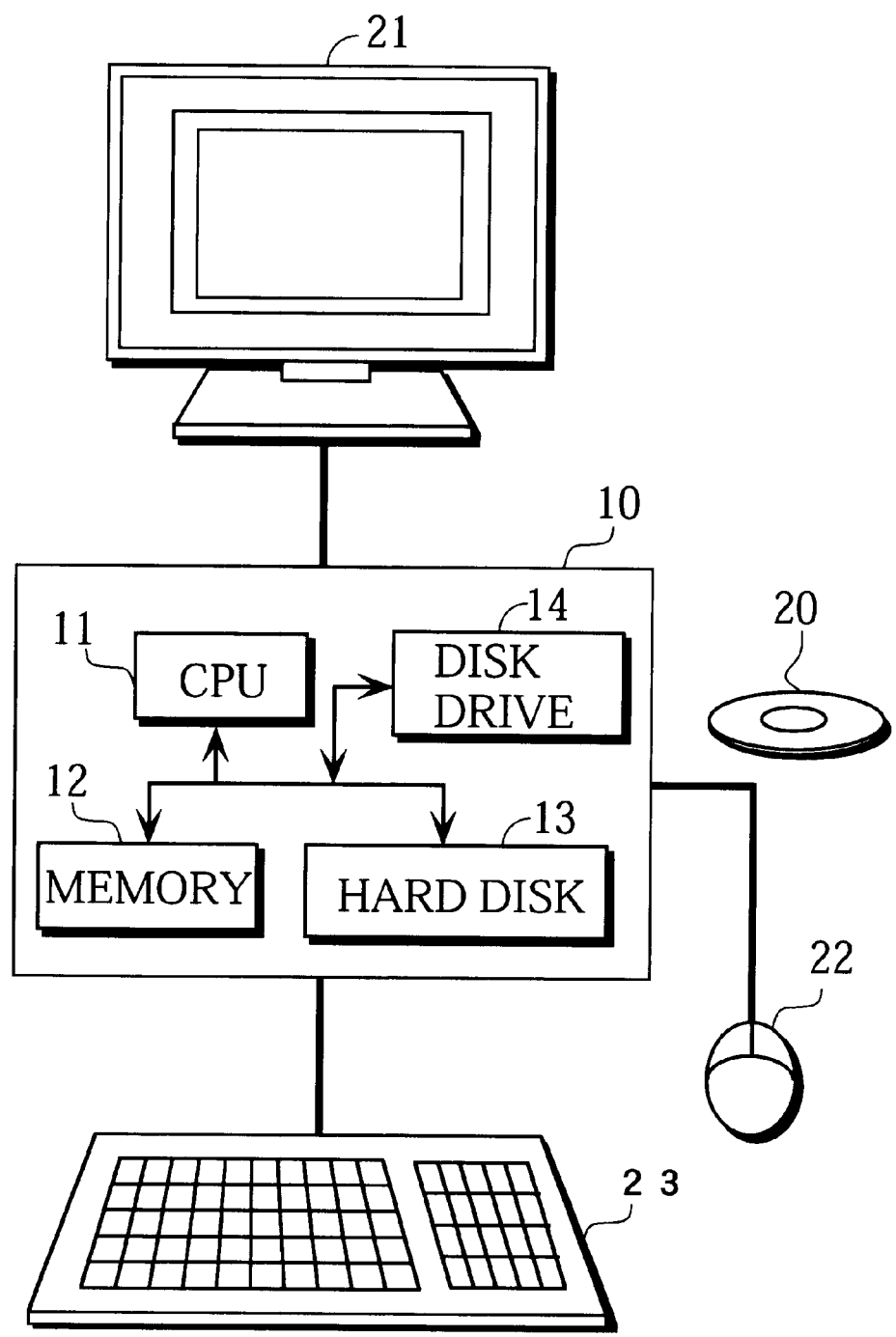
FIG. 7 is a block diagram showing the configuration of a panoramic image synthesizer.

FIG. 7 illustrates the configuration of a panoramic image synthesizer.

A display 21, a mouse 22 and a keyboard 23 are connected to a personal computer 10. The personal computer 10 comprises a CPU 11, a memory 12, a hard disk 13, and a drive (disk drive) 14 of a removable disk such as a CD-ROM.

The hard disk 13 stores a panoramic image synthesis program in addition to an OS (Operating System). The panoramic image synthesis program is installed in the hard disk 13 using a CD-ROM 20 storing the program. It is assumed that a plurality of images picked up by a digital camera are previously stored in the hard disk 13.

Figure 8:
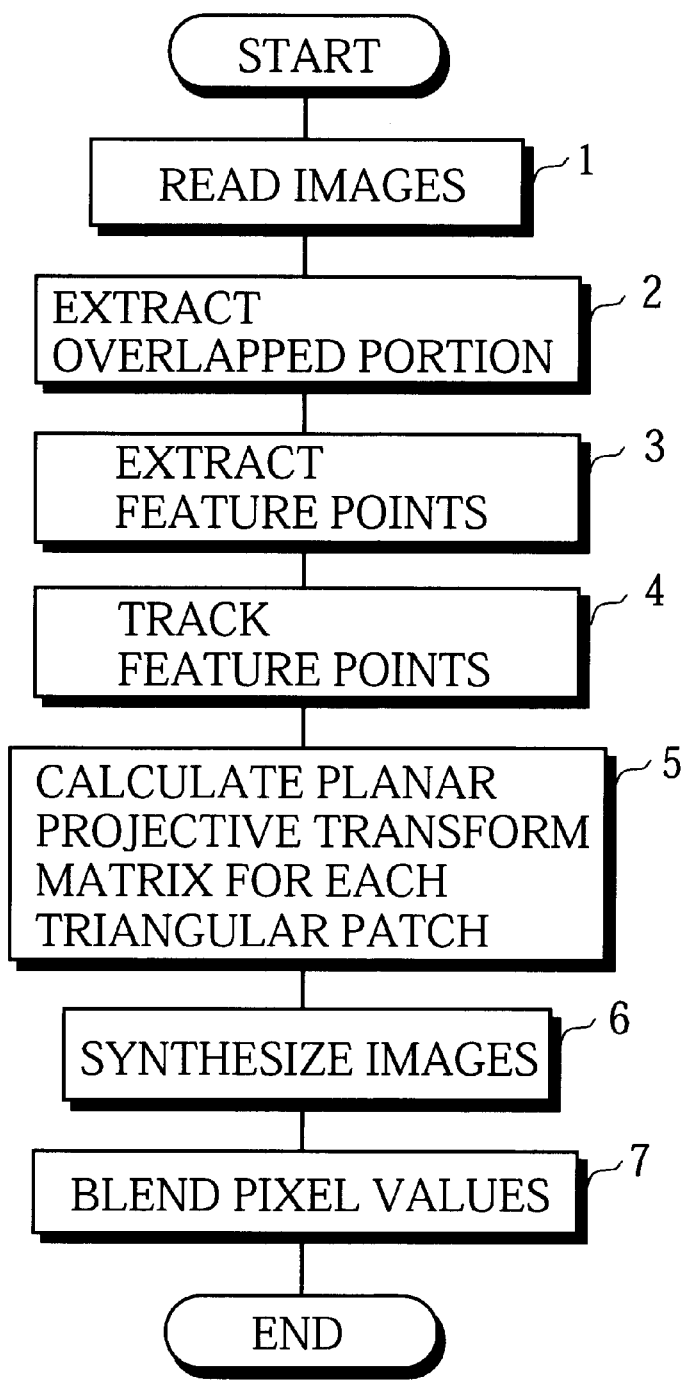
FIG. 8 is a flow chart showing the procedure for panoramic image synthesis processing.

FIG. 8 shows the procedure for panoramic image synthesis processing performed by the CPU 11 in a case where panoramic image synthesis software is started.

For convenience of illustration, description is made of a case where two images are synthesized.

(i) Two images (a first image and a second image) which are designated by a user are read in the memory 12 (step 1).

(ii) Processing for extracting an overlapped portion of the two images is then performed (step 2). The processing for extracting the overlapped portion is performed on the basis of the SSD (Sum of Squared Difference) method and the normalized cross-correlation method, for example. When a change between the two images, for example, two successive images picked up by a video camera, is small, the processing for extracting the overlapped portion can be omitted.

(a) Description of SSD Method

In the SSD method, with respect to two original images, images $I_1$ and $I_2$ having lower resolutions than those of the original images are first respectively produced. An overlapped portion ω (size M×N) of the two images $I_1$ and $I_2$ having low resolutions is found using a squared error (E) per pixel, as expressed by the following equation (10). An amount of movement (d) between the images is changed in an allowable range, and the overlapped portion is extracted from the amount of movement (d) in a case where E is the smallest.

$$E(d) = \frac{\sum_\omega (I_1(x) - I_2(x+d))^2}{M \times N} \quad (10)$$

(b) Description of Normalized Cross-correlation Method

In the normalized cross-correlation method, with respect to two original images, images $I_1$ and $I_2$ having lower resolutions than those of the original images are first respectively produced. An overlapped portion ω (size :M×N) of the two images $I_1$ and $I_2$ having low resolutions is found using a normalized cross-correlation coefficient C, as expressed by the following equation (11). An amount of movement (d) between the images is changed in an allowable range, and the overlapped portion is extracted from the amount of movement (d) in a case where C is the largest.

$$C(d) = \frac{\sum_\omega (I_1(x) - \bar{I}_1)(I_2(x+d) - \bar{I}_2)}{\sqrt{\sigma_1 \cdot \sigma_2}} \quad (11)$$

In the equation (11), $\bar{I}_1$ and $\bar{I}_2$ are averages of respective gray scale values of a first image $I_1$ and a second image $I_2$ in the overlapped portion of both the images in a case where the first image is fixed and the second image is moved by d. $\delta_1$ and $\delta_2$ are respective variances of the gray scale values of the first image $I_1$ and the second image $I_2$ in the overlapped portion of both the images in a case where the first image $I_1$ is fixed and the second image $I_2$ is moved by d.

(iii) Feature points are then extracted (step 3). That is, a plurality of partial images (rectangular regions) which are effective for tracking are extracted as feature points from the overlapped portion of the first image. In this case, the feature points are extracted such that they are not overlapped with each other. Specifically, the above-mentioned portion having a high eigenvalue $\lambda_{min}$ (see FIG. 8) is extracted as the feature point.

iv) The feature points are then subjected to tracking processing (step 4). That is, a position, on the second image, of the extracted feature point on the first image is tracked.

Specifically, an optical flow vector for each patch of suitable size (13×13, for example) is first found by the optical flow estimation method described in the item [1]. The position, on the second image, corresponding to the feature point on the first image is found in sub-pixel precision by linear interpolation from flow vectors in the patches in four vicinities of the feature point on the first image.

(v) A planar projective transform matrix for each triangular patch is then calculated (step 5). Description is first made of a method of finding a planar projective transform matrix in a case where it is assumed that a scene is a single plane.

Figure 9:
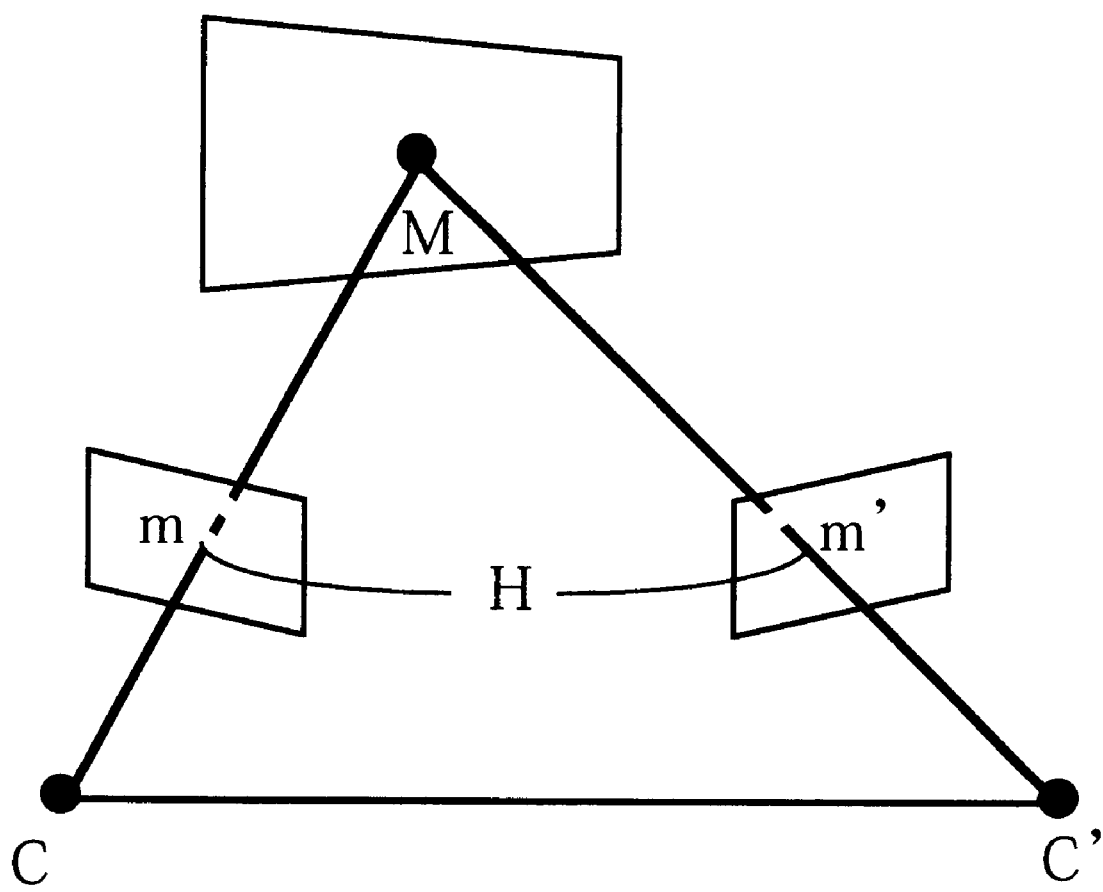
FIG. 9 is an explanatory view for explaining a planar projective transform matrix.

It is known in projective geometry that when a point M on a single plane in a three-dimensional space is observed from two different view points C and C', as shown in FIG. 9, transformation between coordinates m and m' on their respective image surfaces is linear, which is referred to as homography (O. Faugeras, "Three-Dimension Computer Vision: a Geometric Viewpoint", MIT press, 1993.).

That is, in a case where the coordinates of an image are represented by homogeneous coordinates, a point m=(x, y, 1)$^t$ on the first image has a corresponding point m'=(x', y', 1)$^t$ on the second image, and the relationship therebetween is defined by the following equation (12) and more specifically, the following equation (13):

$$m' = Hm \quad (12)$$

$$\begin{pmatrix} x' \\ y' \\ 1 \end{pmatrix} = \begin{pmatrix} h_1 & h_2 & h_3 \\ h_4 & h_5 & h_6 \\ h_7 & h_8 & 1 \end{pmatrix} \begin{pmatrix} x \\ y \\ 1 \end{pmatrix} \quad (13)$$

The transform matrix can be rewritten, as expressed by the following equation (14):

$$x' = \frac{h_1 x + h_2 y + h_3}{h_7 x + h_8 y + 1} \quad y' = \frac{h_4 x + h_5 y + h_6}{h_7 x + h_8 y + 1} \quad (14)$$

Furthermore, the equation (14) can be rewritten, as expressed by the following equation (15).

$$h_1 x + h_2 y + h_3 + 0 h_4 + 0 h_5 + 0 h_6 - x' x h_7 - x' y h_8 = x'$$

$$x h_4 + y h_5 + h_6 - y' x h_7 - y' y h_8 = y' \quad (15)$$

The number of unknown parameters in the planar projective transform matrix H is eight, and a set of corresponding points gives two equations, as expressed by the equation (15). If there are four or more sets of corresponding points, therefore, the planar projective transform matrix H can be found by a method of least squares.

Description was made of a method of finding the planar projective transform matrix H in a case where it is assumed that a scene is a single plane. In the case of a scene of the interior of a room, for example, however, an error is too large to approximate the scene by the single plane. The reason for this is that the depth of the scene is larger than the distance from a camera to an object. As a result, when a first image and a second image are synthesized, lines to be overlapped are doubled or blurred in an overlapped portion of both the images.

In the present embodiment, a method of acquiring planar projective transform matrices Hs where a scene to be synthesized has a large depth, will be described.

Figure 10:
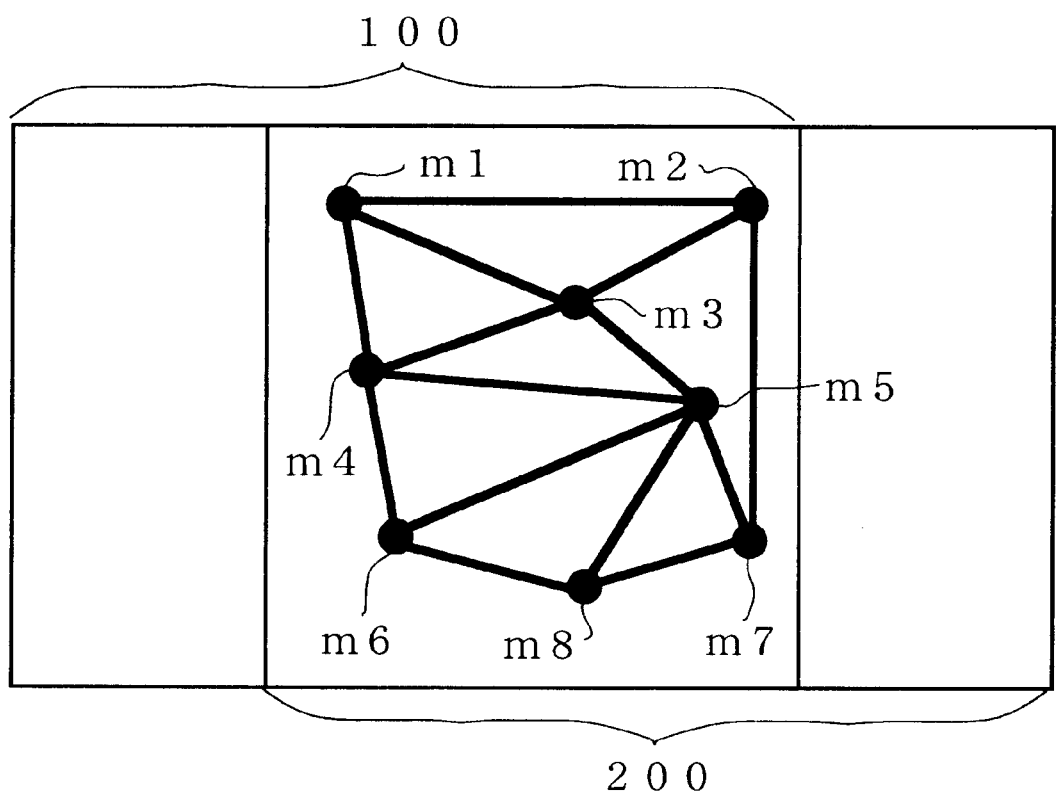
FIG. 10 is a schematic view showing a triangular patch.

Specifically, a scene is divided into triangular patches on the basis of corresponding image feature points $m_1$ to $m_8$ in a first image 100 and a second image 200, to calculate a planar projective transform matrix for each of the patches, as shown in FIG. 10. Each of the triangular patches is a region having three adjacent feature points as vertexes.

In order to calculate the planar projective transform matrix for each of the patches, epipolar constraint conditions are utilized. Examples of a method of calculating the planar projective transform matrix for each patch include a method utilizing a fundamental matrix representing epipolar constraint conditions and a method utilizing a correspondence of epipoles representing epipolar constraint conditions.

(a) Method Utilizing Fundamental Matrix

Description is made of, a method utilizing a fundamental matrix representing epipolar constraint conditions between cameras. Since the degree of freedom of the planar projective transform matrix is eight, four sets of corresponding points are required. Since the number of vertexes of a triangular patch is three, however, the plane projective transform matrix is not generally solved.

Therefore, the inventors of the present invention have developed a method of calculating a planar projective transform matrix for each triangular patch using the fundamental matrix F representing epipolar constraint conditions between cameras and three sets of corresponding points.

A method of calculating a planar projective transform matrix for each triangular patch will be described in detail.

Figure 11:
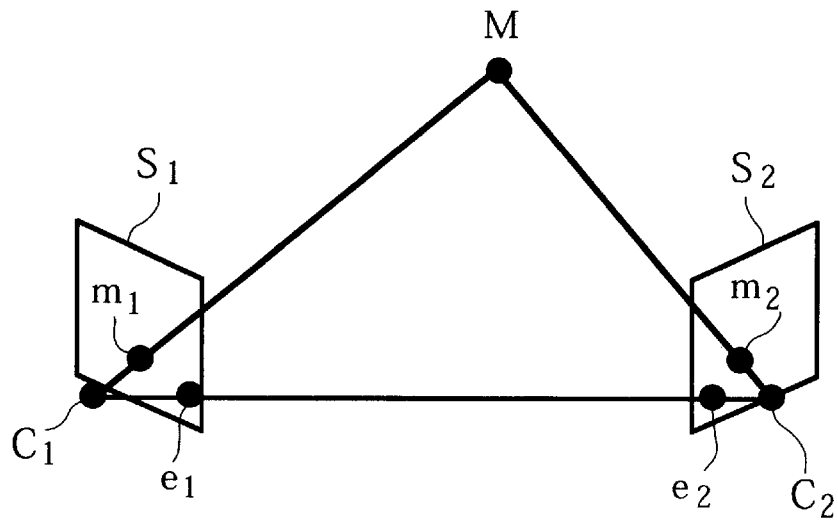
FIG. 11 is a schematic view showing epipolar constraint conditions.

FIG. 11 illustrates the epipolar constraint conditions.

When a point M in a three-dimensional space is observed from different view points $C_1$ and $C_2$, coordinates m1 and $m_2$ on respective imaging surfaces $S_1$ and $S_2$ of cameras must be on a plane composed of M, $C_1$ and $C_2$. This is referred to as epipolar constraint conditions. Further, respective points of intersection $e_1$ and $e_2$ of a line connecting the view points $C_1$ and $C_2$ and the imaging surfaces $S_1$ and $S_2$ are referred to as epipoles. It is known that a fundamental matrix F representing the epipolar constraint conditions and the corresponding epipoles $e_1$ and $e_2$ can be calculated if there are seven or more sets of corresponding points between two images.

The epipolar constraint conditions between the two images are expressed by the following equation (16) using the fundamental matrix F and corresponding points m and m':

$$m'^T F m = 0 \quad (16)$$

The fundamental matrix F is found from seven or more sets of, for example, eight sets of corresponding points. A method of finding the fundamental matrix F has been well known and hence, the description thereof is not repeated (see "Three-dimensional Vision" issued by Kyoritz Publishing Co., Ltd. on Apr. 20, 1998, for example). In recent years, a method of satisfactorily acquiring a fundamental matrix of a stereoscopic camera, which is not calibrated, from a pair of feature points, which correspond to each other, has been proposed. Therefore, it is preferable that the method is used (Z. Zhang, "Determining the Epipolar Geometry and its Uncertainty; A Review", Int. Journal of Computer Vision, Vol. 27, No. 2, pp. 161–195, 1988).

Since m'=Hm, as expressed by the foregoing equation (12), the equation (12) is substituted in the equation (16), to obtain the following equation (17):

$$(Hm)^T Fm = m^T H^T Fm = 0 \quad (17)$$

A matrix $H^T F$ in the foregoing equation (17) must be a skew-symmetric matrix, as expressed by the following equation (18), because it is an outer product of a vector m:

$$H^T F = \begin{pmatrix} 0 & -a_1 & a_2 \\ a_1 & 0 & -a_3 \\ -a_2 & a_3 & 0 \end{pmatrix} \quad (18)$$

Six equations are obtained from the foregoing equation (15) on the basis of three sets of corresponding points. Further, six equations are obtained from the foregoing equation (18). That is, 12 equations are obtained. The number of unknowns in a planar projective transform matrix H is eight, thereby making it possible to calculate the planar projective transform matrix, H for each triangular patch by a method of least squares using the 12 equations.

Specifically, when the three sets of corresponding points are taken as $\{(m_1, m_1'), (m_2, m_2'), (m_3, m_3')\}$, six equations are obtained, as expressed by the following equation (19), on the basis of the foregoing equation (15):

$$\begin{pmatrix} x_1 & y_1 & 1 & 0 & 0 & 0 & -x_1'x_1 & -x_1'y_1 \\ 0 & 0 & 0 & x_1 & y_1 & 1 & -y_1'x_1 & -y_1'y_1 \\ x_2 & y_2 & 1 & 0 & 0 & 0 & -x_2'x_2 & -x_2'y_2 \\ 0 & 0 & 0 & x_2 & y_2 & 1 & -y_2'x_2 & -y_2'y_2 \\ x_3 & y_3 & 1 & 0 & 0 & 0 & -x_3'x_3 & -x_3'y_3 \\ 0 & 0 & 0 & x_3 & y_3 & 1 & -y_3'x_3 & -y_3'y_3 \end{pmatrix} \begin{pmatrix} h_1 \\ h_2 \\ h_3 \\ h_4 \\ h_5 \\ h_6 \\ h_7 \\ h_8 \end{pmatrix} = \begin{pmatrix} x_1' \\ y_1' \\ x_2' \\ y_2' \\ x_3' \\ y_3' \end{pmatrix} \quad (19)$$

The foregoing equation is expressed by the following equation (20):

$$H^T F = \begin{pmatrix} h_1 & h_4 & h_7 \\ h_2 & h_5 & h_8 \\ h_3 & h_6 & 1 \end{pmatrix} \begin{pmatrix} f_1 & f_2 & f_3 \\ f_4 & f_5 & f_6 \\ f_7 & f_8 & f_9 \end{pmatrix} = \begin{pmatrix} 0 & -a_1 & a_2 \\ a_1 & 0 & -a_3 \\ -a_2 & a_3 & 0 \end{pmatrix}$$

$$= \begin{pmatrix} h_1 f_1 + h_4 f_4 + h_7 f_7 & h_1 f_2 + h_4 f_5 + h_7 f_8 & h_1 f_3 + h_4 f_6 + h_7 f_9 \\ h_2 f_1 + h_5 f_4 + h_8 f_7 & h_2 f_2 + h_5 f_5 + h_8 f_8 & h_2 f_3 + h_5 f_6 + h_8 f_9 \\ h_3 f_1 + h_6 f_4 + f_7 & h_3 f_2 + h_6 f_5 + f_8 & h_3 f_3 + h_6 f_6 + f_9 \end{pmatrix}$$

Three equations are obtained, as expressed by the following equation (21) from conditions under which a diagonal matrix is zero:

$$h_1 f_1 + h_4 f_4 + h_7 f_7 = 0$$
$$h_2 f_2 + h_5 f_5 + h_8 f_8 = 0$$
$$h_3 f_3 + h_6 f_6 + f_9 = 0 \quad (21)$$

One equation is obtained, as expressed by the following equation (22), from conditions under which $-a_1 + a_1 = 0$ in the skew-symmetric matrix in the foregoing equation (20):

$$f_2 h_1 + f_1 h_2 + f_5 h_4 + f_4 h_5 + f_8 h_7 + f_7 h_8 = 0 \quad (22)$$

One equation is obtained, as expressed by the following equation (23), from conditions under which $a_2 - a_2 = 0$ in the skew-symmetric matrix in the foregoing equation (20):

$$f_3 h_1 + f_1 h_3 + f_6 h_4 + f_4 h_6 + f_9 h_7 = -f_7 \quad (23)$$

One equation is obtained, as expressed by the following equation (24), from: conditions under which $-a_3 + a_3 = 0$ in the skew-symmetric matrix in the foregoing equation (20):

$$f_3 h_2 + f_2 h_3 + f_6 h_5 + f_5 h_6 + f_9 h_8 = -f_8 \quad (24)$$

Six equations are obtain,ed, as expressed by the following equation (25), from the foregoing equations (21) to (24):

$$\begin{pmatrix} f_1 & 0 & 0 & f_4 & 0 & 0 & f_7 & 0 \\ 0 & f_2 & 0 & 0 & f_5 & 0 & 0 & f_8 \\ 0 & 0 & f_3 & 0 & 0 & f_6 & 0 & 0 \\ f_2 & f_1 & 0 & f_5 & f_4 & 0 & f_8 & f_7 \\ f_3 & 0 & f_1 & f_6 & 0 & f_4 & f_9 & 0 \\ 0 & f_3 & f_2 & 0 & f_6 & f_5 & 0 & f_9 \end{pmatrix} \begin{pmatrix} h_1 \\ h_2 \\ h_3 \\ h_4 \\ h_5 \\ h_6 \\ h_7 \\ h_8 \end{pmatrix} = \begin{pmatrix} 0 \\ 0 \\ -f_9 \\ 0 \\ -f_7 \\ -f_8 \end{pmatrix} \quad (25)$$

When the foregoing equations (19) and (25) are made simultaneous, 12 equations are obtained, as expressed by the following equation (26):

$$\begin{pmatrix} x_1 & y_1 & 1 & 0 & 0 & 0 & -x_1'x_1 & -x_1'y_1 \\ 0 & 0 & 0 & x_1 & y_1 & 1 & -y_1'x_1 & -y_1'y_1 \\ x_2 & y_2 & 1 & 0 & 0 & 0 & -x_2'x_2 & -x_2'y_2 \\ 0 & 0 & 0 & x_2 & y_2 & 1 & -y_2'x_2 & -y_2'y_2 \\ x_3 & y_3 & 1 & 0 & 0 & 0 & -x_3'x_3 & -x_3'y_3 \\ 0 & 0 & 0 & x_3 & y_3 & 1 & -y_3'x_3 & -y_3'y_3 \\ f_1 & 0 & 0 & f_4 & 0 & 0 & f_7 & 0 \\ 0 & f_2 & 0 & 0 & f_5 & 0 & 0 & f_8 \\ 0 & 0 & f_3 & 0 & 0 & f_6 & 0 & 0 \\ f_2 & f_1 & 0 & f_5 & f_4 & 0 & f_8 & f_7 \\ f_3 & 0 & f_1 & f_6 & 0 & f_4 & f_9 & 0 \\ 0 & f_3 & f_2 & 0 & f_6 & f_5 & 0 & f_9 \end{pmatrix} \begin{pmatrix} h_1 \\ h_2 \\ h_3 \\ h_4 \\ h_5 \\ h_6 \\ h_7 \\ h_8 \end{pmatrix} = \begin{pmatrix} x_1' \\ y_1' \\ x_2' \\ y_2' \\ x_3' \\ y_3' \\ 0 \\ 0 \\ -f_9 \\ 0 \\ -f_7 \\ -f_8 \end{pmatrix} \quad (26)$$

Since the number of unknowns in the planar projective transform matrix H is eight, the planar projective transform matrix H corresponding to the triangular patch is calculated using the method of least squares.

(b) Method Utilizing Correspondence Between Epipoles

Description is made of a method utilizing a correspondence between epipoles. The correspondence between epipoles is found from a fundamental matrix F. This method is a method of finding a planar projective transform matrix for each triangular patch from:sets of corresponding points at three vertexes of a triangular patch between two images and corresponding points of the epipoles between the images.

Figure 12:
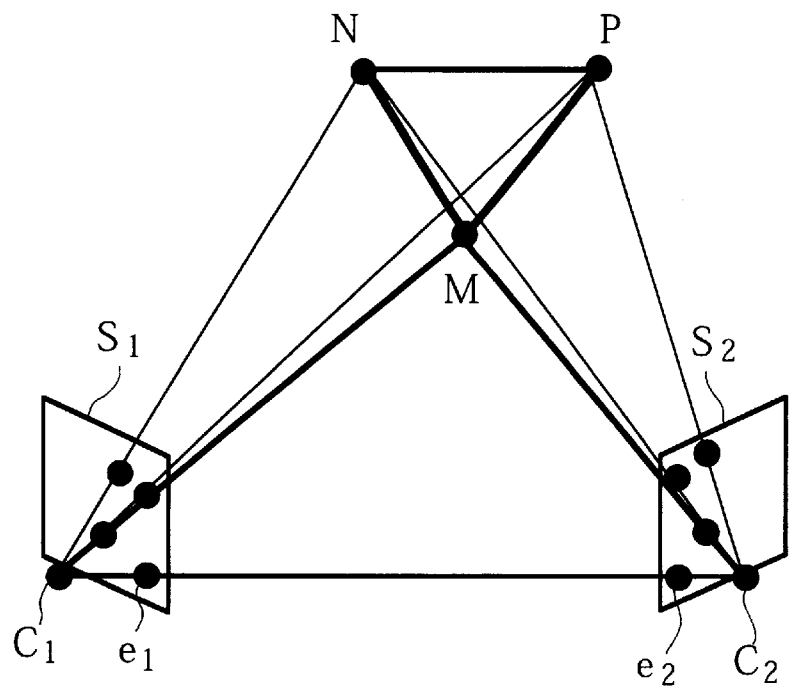
FIG. 12 is a schematic view showing a triangular patch having N, M, and P as vertexes and epipoles $e_1$ and $e_2$.

FIG. 12 illustrates a triangular patch having N, M, and P as vertexes, and epipoles $e_1$ and $e_2$.

The epipoles $e_1$ and $e_2$ are always the same irrespective of the position and the posture of the triangular patch. A total of four sets of corresponding points are found from the sets of corresponding points at the three vertexes of the triangular patch between the two images (three sets of corresponding points) and corresponding points of the eipoles between the two images (one set of corresponding points).

Eight equations are obtained, expressed by the following equation (27), on the basis of the four sets of corresponding points $(x_i, y_i)$ and $(x_i', y_i')$ (i=1, 2, 3, e) and the foregoing equation (15);

$$\begin{pmatrix} x_1 & y_1 & 1 & 0 & 0 & 0 & -x_1'x_1 & -x_1'y_1 \\ 0 & 0 & 0 & x_1 & y_1 & 1 & -y_1'x_1 & -y_1'y_1 \\ x_2 & y_2 & 1 & 0 & 0 & 0 & -x_2'x_2 & -x_2'y_2 \\ 0 & 0 & 0 & x_2 & y_2 & 1 & -y_2'x_2 & -y_2'y_2 \\ x_3 & y_3 & 1 & 0 & 0 & 0 & -x_3'x_3 & -x_3'y_3 \\ 0 & 0 & 0 & x_3 & y_3 & 1 & -y_3'x_3 & -y_3'y_3 \\ x_e & y_e & 1 & 0 & 0 & 0 & -x_e'x_e & -x_e'y_e \\ 0 & 0 & 0 & x_e & y_e & 1 & -y_e'x_e & -y_e'y_e \end{pmatrix} \begin{pmatrix} h_1 \\ h_2 \\ h_3 \\ h_4 \\ h_5 \\ h_6 \\ h_7 \\ h_8 \end{pmatrix} = \begin{pmatrix} x_1' \\ y_1' \\ x_2' \\ y_2' \\ x_3' \\ y_3' \\ x_e' \\ y_e' \end{pmatrix} \quad (27)$$

Since the number of elements ($h_1$ to $h_8$) in the plane projective transform matrix is eight, the elements $h_1$ to $h_8$ are found from the eight equations.

(vi) An image is produced by overlapping both the two images with each other such that the positions of the two images coincide with each other on the basis of the found planar r projective transform matrix for each triangular patch (step 6).

Specifically, a coordinate value, on the first image, corresponding to each of pixels in each of the triangular patches on the second image is found using a planar projective transform matrix H calculated for the triangular patch. On the other hand, a coordinate value, on the first image, corresponding to each of pixels which do not belong to any of the triangular patches on the second image is found using a planar projective transform matrix H calculated for the triangular patch closest to the pixel. The coordinate value, on the first image, corresponding to each of the pixels which do not belong to any of the triangular patches on the second image may be found using a planar projective transform matrix calculated using all corresponding points in an overlapped portion of both the images without dividing a scene into triangles. The planar projective transform matrix calculated using all the corresponding points in the overlapped portion of both the images is a planar projective transform matrix calculated assuming that the scene is a plane, and corresponds to an average of the plane projective transformation matrices for the triangular patches.

The first image and the second image are synthesized using the coordinate value, on the first image, corresponding to each of the pixels on the second image.

At the foregoing step 5, a transform matrix for transforming a point on the first image into a position on the second image is found. Therefore, an image obtained by synthesizing the first image and the second image is obtained using the second image as a reference image.

At the foregoing step 5, a transform matrix for transforming a point, on the second image, corresponding to each of feature points on the first image into a position on the first image may be found on the basis of the point on the second image. When the transform matrix for transforming the point on the second image into the position on the first image is found, an image obtained by synthesizing the first image and the second image is obtained using the first image as a reference image.

(vii) Thereafter, pixel values are blended with respect to an overlapped portion of the two images (step 7). That is, the first image and the second image are not picked up under the same conditions, so that one of the images may, in some cases, be darker than the other image. Therefore, the pixel values of both the images are blended in the overlapped portion of the images.

Figure 13:
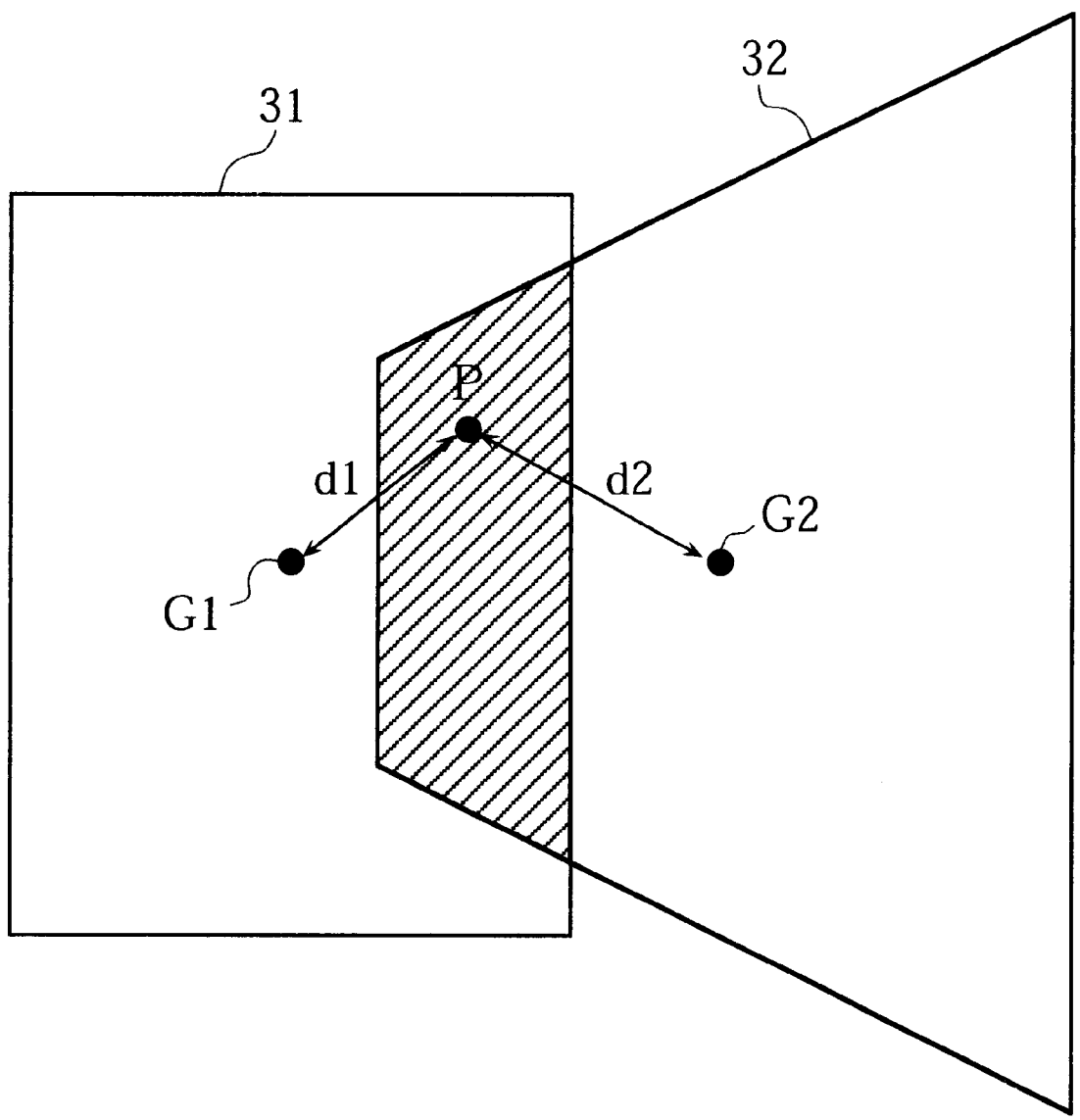
FIG. 13 is an explanatory view for explaining an example of a pixel value blending method.

An example of a method of blending pixel values will be described. FIG. 13 illustrates an image produced at the step 6. A hatched portion shown in FIG. 13 is a portion where a first image 31 and a second image 32 are overlapped with each other (an overlapped portion). In FIG. 13, G1 and G2 respectively indicate the position of the center of gravity of the first image and the position of the center of gravity of the second image.

Letting $I_1$ be a pixel value, on the first image 31, of an arbitrary point P in the overlapped portion, $I_2$ be a pixel value, on the second image 32, of the point P, $d_1$ be the distance between the point P and the position of the center of gravity $G_1$ of the first image, and $d_2$ be the distance between the point P and the position of the center of gravity $G_2$ of the second image, a pixel value Blen, after the blending, of the point P is expressed by the following equation (28):

$$Blen = \frac{d_2 \cdot I_1 + d_1 \cdot I_2}{d_1 + d_2} \quad (28)$$

Although in the above-mentioned embodiment, the planar projective transform matrix H is found for each of the triangular patches, and the coordinate value, on the first image, corresponding to each of the pixels in the triangular patch on the second image is found using the planar projective transform matrix H calculated for the triangular patch, an affine transform matrix A may be found for each of the triangular patches, and the coordinate value, on the first image, corresponding to each of the pixels in the triangular patch on the second image may be found using the affine transform matrix A calculated for the triangular patch.

The affine transform matrix A is expressed by the following equation (29). Since the number of elements $h_1$ to $h_6$ in the affine transform matrix A is six, the elements $h_1$ to $h_6$ can be calculated from only corresponding points at the three vertexes of the triangular patch between the two images:

$$A = \begin{pmatrix} h_1 & h_2 & h_3 \\ h_4 & h_5 & h_6 \\ 0 & 0 & 1 \end{pmatrix} \quad (29)$$

The relationship among the elements $h_1$ to $h_6$ in the transform matrix A and corresponding points $(x_i, y_i)$ and $(x_i', y_i')$ (i=1, 2, 3) at the three vertexes of the triangular patch between the two images is expressed by the following equation (30):

$$\begin{pmatrix} x_1 & y_1 & 1 & 0 & 0 & 0 \\ 0 & 0 & 0 & x_1 & y_1 & 1 \\ x_2 & y_2 & 1 & 0 & 0 & 0 \\ 0 & 0 & 0 & x_2 & y_2 & 1 \\ x_3 & y_3 & 1 & 0 & 0 & 0 \\ 0 & 0 & 0 & x_3 & y_3 & 1 \end{pmatrix} \begin{pmatrix} h_1 \\ h_2 \\ h_3 \\ h_4 \\ h_5 \\ h_6 \end{pmatrix} = \begin{pmatrix} x_1' \\ y_1' \\ x_2' \\ y_2' \\ x_3' \\ y_3' \end{pmatrix} \quad (30)$$

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image synthesis method for synthesizing a first image and a second image without a seam on the basis of coordinate values, on the first image, respectively corresponding to a plurality of feature points which are set in a portion, which is overlapped with the second image, of the first image and coordinate values, on the second image, at positions, on the second image, respectively corresponding to the feature points, comprising:

the first step of dividing both the images for each triangular patch having the three adjacent feature points as vertexes, and finding a transform equation for finding a position, on the first image, corresponding to a point on the second image for the triangular patch;

the second step of finding the coordinate value, on the first image, corresponding to each of pixels in each of the triangular patches, on the second image using the transform equation calculated for the triangular patch;

the third step of synthesizing the first image and the second image using the coordinate value, on the first image, corresponding to each of the pixels on the second image, which is found at the second step.

2. The image synthesis method according to claim 1, wherein the transform equation found for each triangular patch is a planar projective transform matrix, the planar projective transform matrix being found on the basis of corresponding points at the three vertexes of the triangular patch and a fundamental matrix representing epipolar constraint conditions between the first image and the second image.

3. The image synthesis method according to claim 1, wherein the transform equation found for each triangular patch is a planar projective transform matrix, the planar projective transform matrix being found on the basis of a correspondence between corresponding points at the three vertexes of the triangular patch and epipoles representing epipolar constraint conditions between the first image and the second image.

4. The image synthesis method according to claim 1, wherein the transform equation found for each triangular patch is an affine transform matrix, the affine transform matrix being found on the basis of the corresponding points at the three vertexes of the triangular patch.

5. An image synthesizer for synthesizing a first image and a second image without a seam on the basis of coordinate values, on the first image, points which are set in a portion, which is overlapped with the second image, of the first image and coordinate values, on the second image, at positions, on the second image, receptively corresponding to the feature points, comprising:

first means for dividing both the images for each triangular patch having the three adjacent feature points as vertexes, and finding a transform equation for finding a position, on the first image, corresponding to a point on the second image for the triangular patch;

second means for finding the coordinate value on the first image, corresponding to each of pixels in each of the triangular patches, on the second image using the transform equation calculated for the triangular patch;

third means for synthesizing the first image and the second image using the coordinate value, on the first image, corresponding to each of the pixels on the second image which is found by the second means.

6. The image synthesizer according to claim 5, wherein the transform equation found for each triangular patch is a planar projective transform matrix, the planar projective transform matrix being found on the basis of corresponding points at the three vertexes of the triangular patch and a fundamental matrix representing epipolar constraint conditions between the first image and the second image.

7. The image synthesizer according to claim 5, the transform equation found for each triangular patch is a planar projective transform matrix, the planar projective transform matrix being found on the basis of a correspondence between corresponding points at the three vertexes of the triangular patch and epipoleis representing epipolar constraint conditions between the first image and the second image.

8. The image synthesizer according to claim 5, wherein the transform equation found for each triangular patch is an affine transform matrix, the affine transform matrix being found on the basis of the corresponding points at the three vertexes of the triangular patch.

9. A computer readable recording medium on which an image synthesis program for synthesizing a first image and a second image without a seam on the basis of coordinate values, on the first image, respectively corresponding to a plurality of feature points which are set in a portion, which is overlapped with the second image, of the first image and coordinate values, on the second image, at positions, on the second image, respectively corresponding to the feature points has been recorded, comprising:

the first step of dividing both the images for each triangular patch having the three adjacent feature points as vertexes, :and finding a transform equation for finding a position, on the first image, corresponding to a point on the second image for the triangular patch;

the second step of finding the coordinate value, on the first image, corresponding to each of pixels in each of the triangular patches, on the second image using the transform equation calculated for the triangular patch; and the third step of synthesizing the first image and the second image using the coordinate value, on the first image, corresponding to each of the pixels on the second image which is found at the second step.

10. The computer readable recording medium according to claim 9, wherein the transform equation found for each triangular patch is a planar projective transform matrix, the planar projective transform matrix being found on the basis of corresponding points at the three vertexes of the triangular patch and a fundamental matrix representing epipolar constraint conditions between the first image and the second image.

11. The computer readable recording medium according to claim 9, wherein the transform equation found for each triangular patch is a planar projective transform matrix, the planar projective transform matrix being found on the basis of a correspondence between corresponding points at the three vertexes of the triangular patch and epipoles representing epipolar constraint conditions between the first image and the second image.

12. The computer readable recording medium according to claim 9, wherein the transform equation found for each triangular patch is an affine transform matrix, the affine transform matrix being found on the basis of the corresponding points at the three vertexes of the triangular patch.

13. An image synthesis method for synthesizing a first image and a second image, comprising:

the first step of extracting from the first image a plurality of partial images which are effective for tracking by an optical flow between the first image and the second image as feature points;

the second step of tracking a point, on the second image, corresponding to each of the feature points on the first image on the basis of the optical flow between both the images;

the third step of finding a coordinate value, on the first image, corresponding to each of pixels on the second image on the basis of each of the feature points on the first image and the corresponding point on the second image which is found at the second step; and the fourth step of synthesizing the first image and the second image on the basis of the coordinate value on the first image, corresponding to each of the pixels on the second image, which is obtained at the third step, the third step comprising the step of dividing both the images for each triangular patch having three adjacent feature points as vertexes, and finding a transform equation for finding a position, on the first image, corresponding to the point on the second image for the triangular patch, and the step of finding the coordinate value, on the first image, corresponding to each of the pixels in the triangular patch on the second image using the transform equation calculated for the triangular patch.

14. The image synthesis method according to claim 13, wherein the first step comprises the steps of extracting an overlapped portion between the first image and the second image, and extracting from the portion, which is overlapped with the second image, of the first image a plurality of partial images which are effective for tracking by the optical flow between both the images as feature points.

15. The image synthesis method according to claim 14, wherein at the step of extracting the overlapped portion between the first image and the second image, the overlapped portion between the first image and the second image is extracted on the basis of either one of the SSD method and the normalized cross-correlation method.

16. The image synthesis method according to claim 13, wherein the second step comprises the steps of finding the optical flow from the first image and the second image on the basis of an optical flow estimation method using the hierarchically structured Lucas-Kanade method for interpolating the optical flow having low! confidence out of the optical flows obtained in the respective stages of the optical flow estimation method using the optical flows in its surrounding regions, and tracking the point, on the second image, corresponding to each of the feature points on the first image on the basis of the obtained optical flow.

17. The image synthesis method according to claim 13, wherein the transform equation found for each triangular patch is a planar projective transform matrix, the planar projective transform matrix being found on the basis of corresponding points at the three vertexes of the triangular patch and a fundamental matrix representing epipolar constraint conditions between the first image and the second image.

18. The image synthesis method according to claim 13, wherein the transform equation found for each triangular patch is a planar projective transform matrix, the planar projective transform matrix being found on the basis of a correspondence between corresponding points at the three vertexes of the triangular patch and epipoles representing epipolar constraint conditions between the first image and the second image.

19. The image synthesis method according to claim 13, wherein the transform equation found for each triangular patch is an affine transform matrix, the affine transform matrix being found on the basis of the corresponding points at the three vertexes of the triangular patch.

* * * * *